United States Patent
Watanabe

Patent Number: 6,154,473
Date of Patent: Nov. 28, 2000

[54] POWER SUPPLY APPARATUS FOR LASER

[75] Inventor: Mikio Watanabe, Chiba-ken, Japan

[73] Assignee: Miyachi Technos Corporation, Chiba-Ken, Japan

[21] Appl. No.: 09/105,256

[22] Filed: Jun. 26, 1998

[30] Foreign Application Priority Data

| Jun. 27, 1997 | [JP] | Japan | 9-187758 |
| Jun. 27, 1997 | [JP] | Japan | 9-187759 |
| Jul. 4, 1997 | [JP] | Japan | 9-193322 |

[51] Int. Cl.[7] ............... H01S 3/00; G05F 1/10; G05F 1/40; G05F 1/455
[52] U.S. Cl. ............ 372/38; 323/237; 323/242; 323/246
[58] Field of Search ............ 372/38; 323/237, 323/242, 246

[56] References Cited

U.S. PATENT DOCUMENTS

| 5,406,192 | 4/1995 | Vinciarelli et al. | 323/222 |
| 5,694,310 | 12/1997 | Malik et al. | 363/84 |
| 6,069,801 | 5/2000 | Hodge, Jr. et al. | 363/21 |

Primary Examiner—Frank G. Font
Assistant Examiner—Armando Rodriguez
Attorney, Agent, or Firm—Wenderoth, Lind & Ponack, L.L.P.

[57] ABSTRACT

A main power supply unit 10 of this power supply apparatus for laser comprises asingle-phase rectifying circuit 16 for receiving a single-phase AC voltage $E_A$ at a commercial frequency to convert (rectify) it into a direct current, a capacitor 18 for temporarily storing the DC power from the single-phase rectifying circuit 16, a charging circuit 20 connected between the single-phase rectifying circuit 16 and the capacitor 18, and a lamp current supply circuit 22 connected between the capacitor 18 and an excitation lamp 102. The charging circuit 20 includes a switching element 24 for charging connected in parallel with the capacitor between the single-phase rectifying circuit 16 and the capacitor 18, an inductance coil 26 connected in series between the single-phase rectifying circuit 16 and the switching element 24 for charging, and a diode 28 connected in series between the switching element 24 for charging and the capacitor 18. A power-factor control circuit 34 provides a control of switching action of the switching element 18 for charging at a high frequency of 70 kHz for instance so as to allow a charging current $I_C$ supplied to the capacitor 18 to be in phase with a DC voltage $E_B$ output from the single-phase rectifying circuit 16.

12 Claims, 8 Drawing Sheets

POWER SUPPLY APPARATUS FOR LASER

BACKGROUND OF THE INVENTION

1. Field of the Invention

The present invention relates to a power supply apparatus for laser which supplies an electric power to an excitation lamp for use in laser oscillation.

2. Description of the Related Art

Solid-state laser equipment using YAG laser etc., has such a configuration that an optical energy obtained when an excitation lamp is turned on is applied to a YAG rod or other laser medium, to activate laser oscillation.

Figure 10:
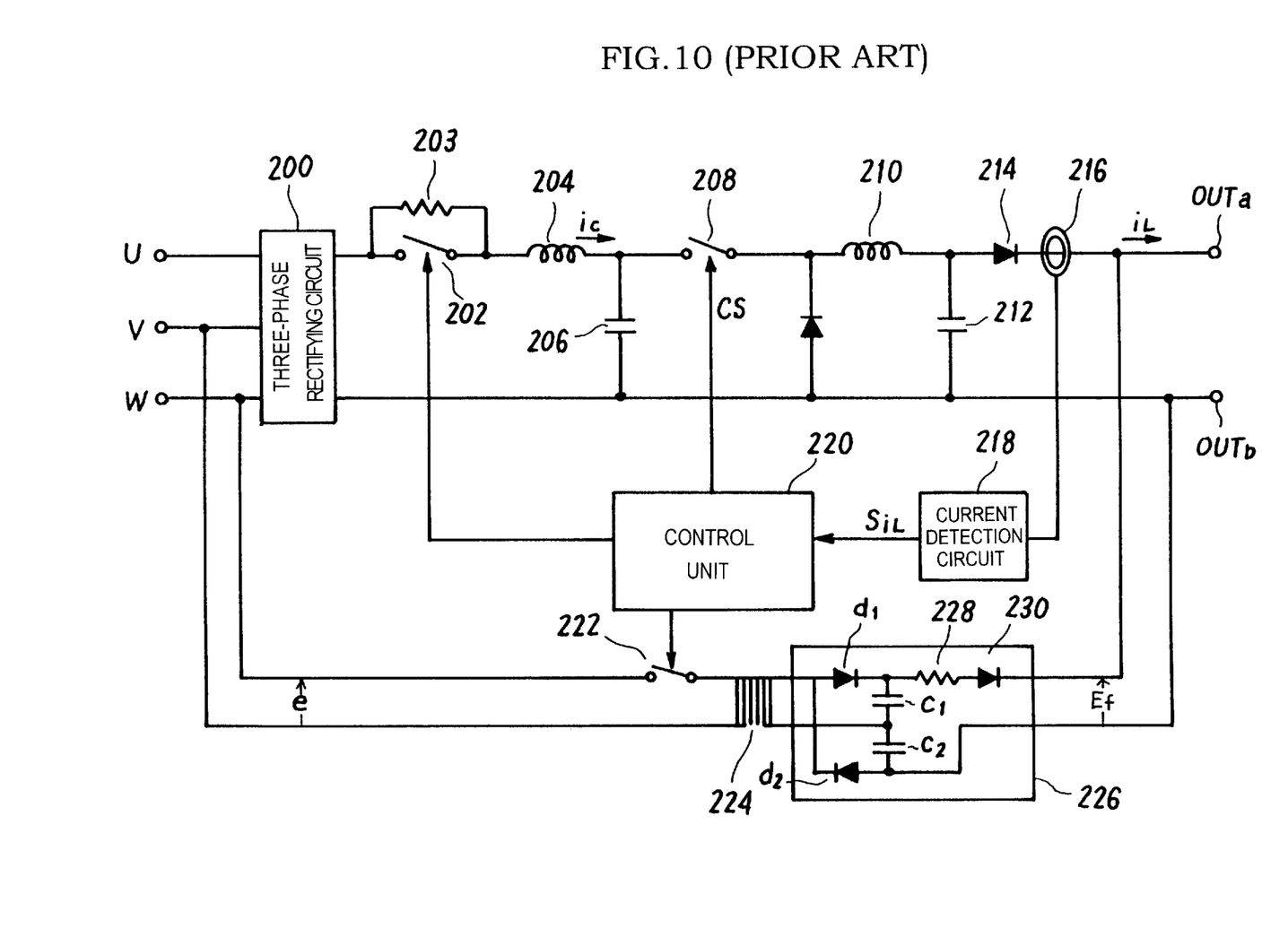
FIG. 10 is a block diagram showing a circuit configuration of the conventional power supply apparatus for laser.

FIG. 10 shows a circuit configuration of a conventional power supply apparatus for laser used in this type of solid-state laser equipment.

In this power supply apparatus for laser, output terminals [OUTa, OUTb] are connected respectively to two electrodes of an excitation lamp (not shown) of a laser oscillation unit.

A three-phase rectifying circuit 200 on the input side rectifies a commercial-frequency three-phase AC voltage supplied from a three-phase AC power supply terminals [U, V, W] into a DC voltage. From the three-phase rectifying circuit 200, a charging DC current $i_c$ flows via a magnetic contactor 202 and a smoothing coil 204 into a capacitor 206 to charge it to a predetermined voltage.

Between the capacitor 206 and the output terminals [OUTa, OUTb], a switching element 208 is connected in series. When the switching element 208 is closed, the capacitor 206 is discharged, so that the discharging current iL flows into the excitation lamp via the switching element 208, an inductance coil 210, an output capacitor 212, and a reverse-current preventing diode 214. The lamp current iL turns the excitation lamp on.

When the switching element 208 is opened, the capacitor 206 is interrupted in its discharge, but electromagnetic energy and electric charge energy saved on the inductance coil 210 and the output capacitor 212 respectively are discharged instead, thus permitting the lamp current iL to keep on flowing.

The discharging switching element 208 is closed and opened by, for example, a 50 kHz high-frequency switching signal CS supplied from a control unit 220. With this, the lamp current iL can flow continuously and the excitation lamp can be on uninterruptedly, to obtain a continuously oscillated laser beam from the laser oscillation unit. The rated voltage applied by such continuous oscillation onto the excitation lamp is, for example, of the order of 150V.

Between the reverse-current preventing diode 214 and the output terminal OUTa, a current sensor 216 is provided to detect the lamp current $i_L$. Based on an output signal fed out from the current sensor 216, a lamp current detection signal $S_{iL}$ is obtained which represents the magnitude of the lamp current, for example its effective current value. The lamp current detection current $S_{iL}$ is then sent to a control unit 220.

The control unit 220, based on the lamp current detection signal $S_{iL}$ from the current detection circuit 218, controls the switching action of the switching element 208 so as to provide a matching between the lamp current $i_L$ and a preselected current value. Moreover, if the lamp current $i_L$ flows excessively due to the breakage, damage, etc. of the switching element 208, the control unit 220 breaks the magnetic contactor 202. It is noted that a resistor 203 connected in parallel with the magnetic contactor 202 is a current-limiting resistor.

This type of power supply apparatus for laser comprises, as well as the main power supply unit to provide laser oscillation power to the excitation lamp as mentioned above, a trigger circuit (not shown) and a booster circuit for initiating the lighting of the excitation lamp.

In the illustrated conventional power supply apparatus for laser, one-phase AC voltage e (220V) of the three-phase AC power supply voltage is supplied to the primary coil of a step-up transformer 224, thus causing a step-up voltage, e.g. 1000V obtained across the secondary coil of the step-up transformer 224 to be applied to the booster circuit 226. Then, the booster circuit 226 rectifies the AC voltage from the transformer 224 through diodes $d_1$ and $d_2$ and charges in series the rectified voltage on capacitors $c_1$ and $c_2$ up to, which is stepped up to, e.g. 2,500V, with the boosted high voltage being then applied via a resistor 228 and a reverse-current preventing diode 230 to the excitation lamp as a boost voltage $E_f$.

Before turning the excitation lamp on, the control unit 220 first activates the main power supply and the booster circuit 226. That is, for the main power supply unit, the control unit 220 closes the magnetic contactor 202 to supply the switching control signal CS to the switching element 208. For the booster circuit 226, the control unit 220 closes a switch 222 provided on the primary circuit of the step-up transformer 224.

Thus, with the main power supply and the booster circuit 226 being on standby, the control unit 220 operates the trigger circuit (not shown). With this operation of the trigger circuit, a gas within the excitation lamp is broken down, to rapidly lower the lamp impedance. When, on top of that, a boost voltage Ef of approximately 2500V is applied onto the excitation lamp from the booster circuit, the excitation lamp impedance drops further, causing a current to flow in the excitation lamp. Thereafter, even a low lamp voltage of the order of 150V from the main power supply is enough to cause a flow of a sufficient magnitude of the lamp current iL required to turn the lamp on.

In order to obtain a high laser oscillation efficiency, it is necessary for this kind of solid-state laser equipment that the light conversion efficiency from the lamp optical energy to laser output should be high at the laser oscillation unit or that the power conversion efficiency (power factor) of supply power from the AC power supply to input power should be high at the power supply apparatus for laser.

To obtain such a high power conversion efficiency, the above-mentioned conventional power supply apparatus for laser provides a three-phase AC power supply as the input and employs the three-phase rectifying circuit 200 for rectification. Since the three-phase rectifying circuit 200 places across its output terminals a DC line voltage with small ripples, the capacitor 206 is supplied with a charging current ic having few higher harmonics components, to obtain a capacitor charging voltage which is stable against fluctuations in the supply voltage. Thus, power can be supplied to the excitation lamp at a high power conversion efficiency (power factor).

However, the three-phase power supply apparatuses for laser are large, heavy, and expensive and suffers from a big constraint that they can be used only where a three-phase power supply is provided or wired.

In addition, the conventional power supply apparatus for laser has in its main circuit the magnetic contactor 202 comprising electromagnetic relays, so that in emergency of an excessive current etc., the magnetic contactor 202 can be opened (broken) by the control unit 220. The magnetic contactor 202, however, is of such a mechanism that operates mechanical contacts for closing and opening operations (switching). Therefore, this contactor 202 takes a considerable time to complete switching operation after it has received a control signal. With this, it is difficult for this type of mechanism to rapidly break the main circuit if an abnormality such as an excessive current is detected, being insufficient in security.

Also, to obtain a continuously oscillating laser beam by lighting the excitation lamp uninterruptedly, the above-mentioned conventional power supply apparatus for laser must provide switching control over the discharging switching element 208 at a frequency (50 kHz) extraordinarily higher than the power frequency, to supply a continuous (uninterrupted) lamp current $i_L$ to the excitation lamp. Therefore, the switching element 208 is damaged with switching operations and easily destroyed.

If the switching element 208 is destroyed and short-circuited, the excitation lamp current iLbecomes excessive, causing lamp failures. To guard against this, as mentioned above, the current sensor 216 and the current detecting circuit 218 are provided to detect such an excessive current so that the control unit 220 can turn off the magnetic contactor 202 of the main circuit.

However, the destruction of the switching element 208 results in the interruption of the laser oscillation at that point of time. In case of the laser beam processing apparatus, for example, the laser beam processing must be interrupted or stopped at that time, which is disadvantageous in view of the production management or quality control. It is therefore desired to extend the service life of the switching element 208 as long as possible to lessen the frequency at which the laser oscillation is unwillingly interrupted.

As a solution to the above problem, a method is conceivable in which a plurality of switching elements 208 are connected in parallel so that they can perform parallel actions, that is, can be turned on/off at the same time, to thereby reduce the burdens or loads per element.

Typically, however, FETs (Field Effect Transistors), IGBTs (Insulated Gate Bipolar Transistors), etc., used as such switching elements may often suffer from some unevenness in characteristics (in particular, on-resistance value) among elements. For this reason, in the above method, a larger amount of current may flow concentratedly through a switching element having the lowest on-resistance value among the plurality of switching elements 208 performing the parallel actions. As a result, that switching element may fatigue and destroyed earlier, inconveniently preventing the parallel operation from effective functioning.

In order to start the lighting of the excitation lamp in the conventional power supply apparatus for laser described above, the trigger circuit is operated while the main power supply unit is activated or stand-by. In this case, the excitation lamp is put in high-impedance state up until immediately before the lighting. For this reason, the main power supply unit in the stand-by state applies to the excitation lamp a maximum output voltage equal to the voltage (280V) at the capacitor 206.

Thus, when the impedance of the excitation lamp is lowered by the trigger circuit and the booster circuit 226, an excessive lamp current $i_L$ will flow into the excitation lamp although momentarily, because the lamp voltage from the main power supply unit has a voltage value (280V) which is considerably higher than the rated value (about 150V). This often caused the failures of the lamp.

Furthermore, in the conventional power supply apparatus for laser as described above, the AC power supply voltage e is stepped up by the step-up transformer 224, and the secondary voltage of the transformer 224 is further boosted by the step-up circuit or the booster circuit 226, to thereby generate a boost voltage $E_f$ having a desired voltage value.

However, such a boosting method may suffer from a deficiency that it is susceptible to fluctuation of the AC power supply voltage, resulting in an unstable boost voltage $E_f$. More specifically, if the AC power supply voltage e fluctuates, the amount of the fluctuation may be boosted up to several times (e.g., ten times) by the step-up transformer 224 and the booster circuit 226, which reflects on the boost voltage $E_f$.

As a result, the excitation lamp may not light up due to the fact that the boost voltage $E_f$ is considerably lower than the preselected voltage value (2500V) at the start of the lighting of the excitation lamp. On the contrary, the excitation lamp may break down due to an extremely high boost voltage $E_f$.

SUMMARY OF THE INVENTION

The present invention was conceived in view of such deficiencies involved in the prior art. It is therefore an object of the present invention to provide a power supply apparatus for laser of popular type ensuring an acquisition of a stabilized electric power for laser oscillation with a high efficiency even in case of using a single-phase AC power source.

Another object of the present invention is to provide a power supply apparatus for laser ensuring a prompt interruption of a main circuit upon the occurrence of abnormality such as overcurrent to thereby improve its safety function.

A further object of the present invention is to provide a power supply apparatus for laser ensuring an elongated service life of switching means for supplying a lamp current to an excitation lamp to thereby reduce a possible interruption of the laser oscillation attributable to any failure of switching means.

Still another object of the present invention is to provide a power supply apparatus for laser capable of preventing an excessive lamp current from being supplied from the main power supply unit at the start of lighting of the excitation lamp to thereby secure the safety of the lamp and other circuit elements.

A still further object of the present invention is to provide a power supply apparatus for laser ensuring an acquisition of a booster voltage for the start of the lighting of the excitation lamp which has been stabilized irrespective of the fluctuation of the input power supply voltage and so forth.

Yet another object of the present invention is to provide a power supply apparatus for laser ensuring an acquisition of a stable booster voltage even from the single-phase AC power supply voltage.

An yet further object of the present invention is to provide a laser power supply apparatus ensuring safe and secure lighting of the excitation lamp at the start of the lighting.

In order to achieve the above object, a first power supply apparatus for laser of the present invention for supplying an electric power to an excitation lamp which irradiates an optical energy for laser oscillation onto a laser medium, comprises a single-phase rectifying circuit for receiving and rectifying a single-phase AC voltage having a commercial frequency; a capacitor for temporarily storing a DC power from the single-phase rectifying circuit; switching means for charging connected between the single-phase rectifying circuit and the capacitor; lamp current supply means for causing the capacitor to discharge an electric energy stored therein to supply a lamp current to the excitation lamp; and power-factor control means for controlling the switching action of the switching means for charging at a predetermined frequency higher than the commercial frequency so as to allow a phase of a charging current fed to the capacitor from the single-phase rectifying circuit to coincide with a phase of a DC voltage output from the rectifying circuit.

According to an aspect, in the first power supply apparatus for laser, the power factor control means provide a switching control of the switching means for allowing a waveform of a charging current supplied to the capacitor to simulate a waveform of a DC voltage output from the rectifying circuit.

According to another aspect, the power-factor control means include reference value signal generating means for generating a reference value signal which is inversely proportional to a charging voltage at the capacitor and which is proportional to a DC voltage from the rectifying circuit; a bypass circuit including the switching means for charging connected in parallel with the capacitor; switch timing detection means for generating a predetermined switch timing signal when a bypass current flowing though the bypass circuit reaches a value of the reference value signal; a clock circuit for generating a clock pulse having the predetermined frequency; and current switch means for switching the switching means for charging from OFF state to ON state at the start of cycle in each cycle defined by the clock pulse, the current switch means for switching the switching means for charging from ON state to OFF state in response to a switch timing signal from the switch timing detection means.

According to such a first power supply apparatus for laser, an AC power from the single-phase AC power source is converted into a DC power with a high efficiency for the supply to the excitation lamp, so that it is realized at the same time to improve the laser oscillation efficiency and to reduce the weight and size. In addition, the main circuit is rapidly interrupted at the time of occurrence of any abnormality such as overcurrent, so that the safety function can be improved.

A second power supply apparatus for laser of the present invention for supplying an electric power to an excitation lamp which irradiates an optical energy for laser oscillation onto a laser medium, comprises a rectifying circuit for receiving and rectifying an AC voltage having a commercial frequency; a capacitor for temporarily storing a DC power from the rectifying circuit; first and second switching elements each connected in series between the capacitor and the excitation lamp, the first and second switching elements being connected in parallel with each other; and control means for alternately turning on the first and second switching means at a predetermined frequency higher than the commercial frequency.

According to such a second power supply apparatus for laser of the present invention, a parallel operation is effected in which the plurality of switching elements for supplying a lamp current to the excitation lamp are alternately turned on, whereby it is possible to substantially evenly reduce the burdens of the switching elements to achieve an elongation of service life of the elements and to reduce the possibility of interruption of the laser oscillation attributable to the failure of the switching elements. This contributes to an improvement in the production control and quality control in the laser processing apparatus for instance.

A third power supply apparatus for laser of the present invention for supplying an electric power to an excitation lamp in a laser oscillation unit, comprises a rectifying circuit for receiving and rectifying an AC voltage having a commercial frequency; a capacitor for temporarily storing a DC power from the rectifying circuit; charging voltage control means for controlling a charging voltage at the capacitor so as to have a certain voltage value which has been set in advance; lamp current supply means for causing the capacitor to discharge an electric energy stored therein to supply a lamp current to the excitation lamp; an inverter for receiving a charging voltage at the capacitor to convert it into an AC voltage having a predetermined frequency higher than the commercial frequency; a boosting circuit for boosting an AC voltage from the inverter to generate a DC booster voltage having a previously set voltage value; and lighting start control means for allowing the booster voltage to be supplied to the excitation lamp at the start of lighting of the excitation lamp.

According to the third power supply apparatus for laser of the present invention, an input AC power supply voltage is rectified and converted into a stable DC voltage, and thereafter is charged into a capacitor. The excitation lamp for laser oscillation is lit up by a lamp current derived from a discharge of the capacitor. At the start of lighting of the lamp, the charging voltage at the capacitor is converted by the inverter into a high-frequency AC voltage which in turn is boosted in the boosting circuit. The thus obtained stable booster voltage is applied to the excitation lamp so that the latter can start to light up in a safe and secure manner.

BRIEF DESCRIPTION OF THE DRAWINGS

The above and other objects, features and advantages of the present invention will become more apparent from the following detailed description with reference to the accompanying drawings, in which.

DESCRIPTION OF THE PREFERRED EMBODIMENT

Figure 1:
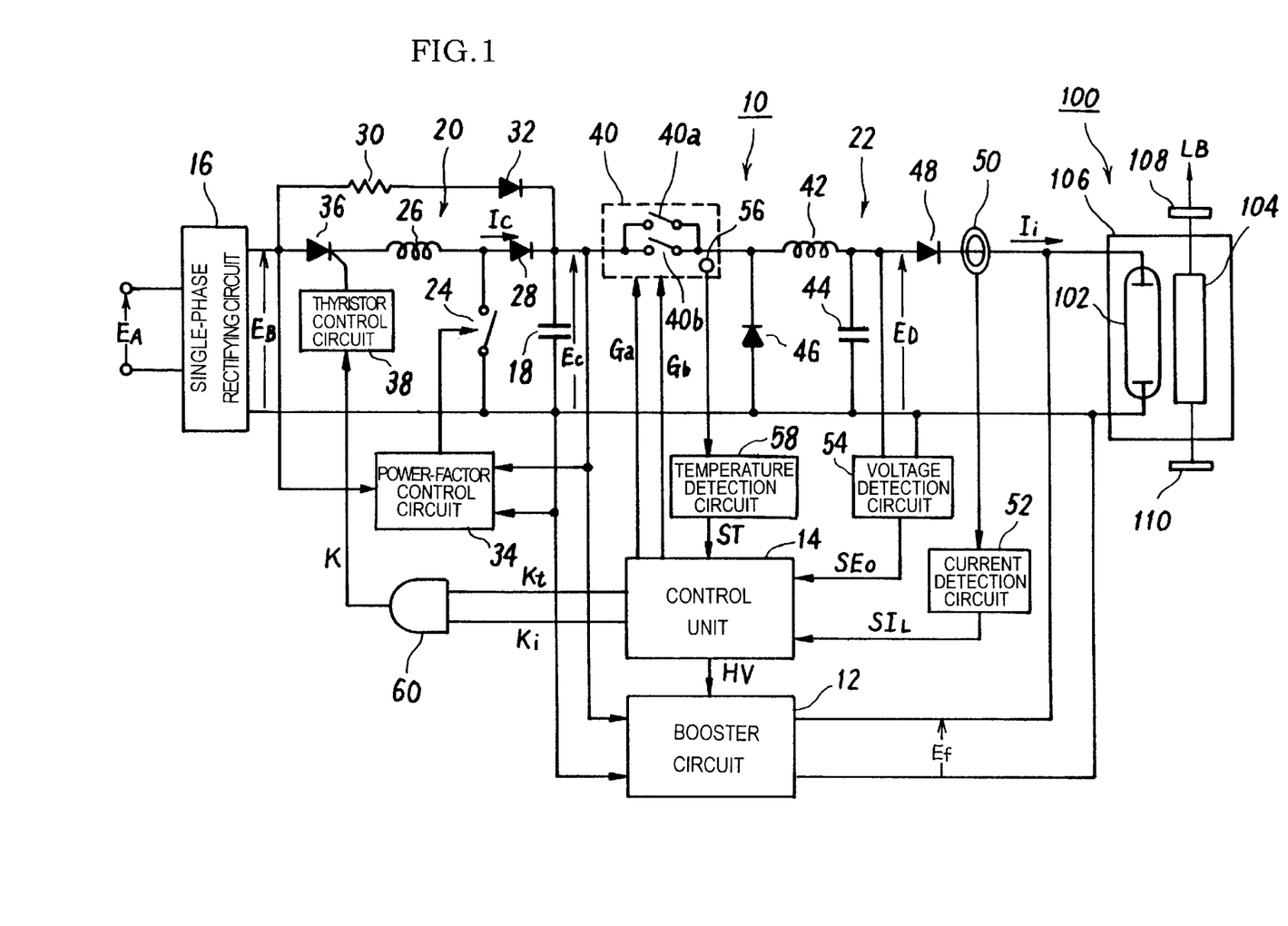
FIG. 1 is a block diagram showing a circuit configuration of a power supply apparatus for laser in accordance with an embodiment of the present invention.

FIG. 1 illustrates a circuit configuration of a power supply apparatus for laser in accordance with an embodiment of the present invention. This power supply apparatus for laser is built into a solid-state laser apparatus, e.g., a YAG laser beam processing apparatus and supplies an electric power to an excitation lamp 102 of a laser oscillating unit 100.

In the laser oscillating unit 100, the excitation lamp 102 and a YAG rod 104 (a laser medium) are arranged in an adjacent manner within a reflector cylinder (not shown) provided in a chamber 106 made of, e.g., acrylic resin. On the optic axis of the YAG rod 104 outside the chamber 106 are positioned a pair of optical resonator mirrors 108 and 110 confronting each other in a parallel manner with the YAG rod 104 interposed therebetween.

When the excitation lamp 102 emits a light under the action of a lamp current $I_L$ supplied from the power supply apparatus for laser of this embodiment described later, the YAG rod 104 is excited by the optical energy, allowing the light to issue axially from the opposite end faces of the YAG rod 104. The light is then reflected repeatedly and amplified between the optical resonator mirrors 108 and 110, and thereafter exits the output mirror 108 as a laser beam LB. The laser beam LB which has exited the output mirror 108 is projected via a mirror (not shown) or via an input unit, an optical fiber and an output unit (not shown) to a processing point on a workpiece (not shown).

The power supply apparatus for laser of this embodiment comprises a main power supply unit 10 for supplying an electric power for laser oscillation to the excitation lamp 102, a booster circuit 12 and a trigger circuit (not shown) for initiating a lighting of the excitation lamp 102, a control unit 14 for providing a control of the entire apparatus, and a power-factor control circuit 34 for the control of a power factor of the main power supply unit.

The main power supply unit 10 includes a single-phase rectifying circuit 16 for inputting a single-phase AC voltage $E_A$ at a commercial frequency (50 Hz or 60 Hz) to convert (rectify) it into a DC voltage, a capacitor 18 for temporarily storing the DC power from the single-phase rectifying circuit 16, a charging circuit connected between the single-phase rectifying circuit 16 and the capacitor 18, and a lamp current supply circuit 22 connected between the capacitor 18 and the excitation lamp 102.

The single-phase rectifying circuit 16 is comprised for instance of a single-phase full-wave rectifying circuit, which full-wave-rectifies the input single-phase AC voltage $E_A$ to provide as its output a DC voltage $E_B$ having a full-wave-rectified waveform in which half waves of sinusoidal waveform repeat at a cycle of 180°.

The charging circuit 20 includes a switching element 24 for charging connected in parallel with the capacitor 18 between the single-phase rectifying circuit 16 and the capacitor 18, an inductance coil 26 connected in series between the single-phase rectifying circuit 16 and the switching element 24 for charging, and a diode 28 connected in series between the switching element 24 for charging and the capacitor 18.

Between the single-phase rectifying circuit 16 and the capacitor 18 is connected a charging bypass circuit consisting of a current-limiting resistor 30 and a reverse-current prevention diode 32, with the charging bypass circuit being in parallel with a charging circuit consisting of the inductance coil 26 and the diode 28. A thyristor 36 is also provided as a circuit contactor for the charging circuit. A thyristor control circuit 38 provides an ON/OFF-state control of the thyristor 36.

The switching element 24 for charging is comprised for instance of a FET, of which switching action is controlled by the power factor control circuit (PFC) 34 of this embodiment.

As described hereinbelow, the power factor control circuit 34 provides a switching control of the switching element 24 for charging at a high frequency of 70 kHz for instance so as to allow the phase of a charging current $I_C$ supplied to the capacitor 18 to coincide with the phase of the DC voltage $E_B$ output from the single-phase rectifying circuit 16. It is thus possible to approximate to 1 as close as possible the power factor, that is, the ratio of an effective power supplied actually (effectively) to the excitation lamp 102 side to an AC power input to the apparatus. This enables a single-phase power supply apparatus to realize a high power efficiency and a high laser oscillation efficiency. A charging voltage $E_C$ at the capacitor 18 is boosted up to e.g., 360V relative to the input AC voltage $E_A$ of e.g., 220V, so that the excitation lamp 102 can be supplied with a stabilized power free from any influence of fluctuation in voltage at the input AC power supply.

The lamp current supply circuit 22 includes a switching circuit 40 for discharging, an inductance coil 42, an output capacitor 44, a diode 46 and a reverse-current prevention diode 48.

The switching circuit 40 for discharging is connected in series between the capacitor 18 and the excitation lamp 102 and consists of a pair of switching elements 40a and 40b connected with each other in parallel. These switching elements 40a and 40b can be high-speed and large-capacity transistors such as FETs or IGBTs for instance.

The control unit 14 imparts switching control signals Ga and Gb at a frequency higher than the commercial frequency, for example, at 25 kHz to control terminals of the switching elements 40a and 40b, respectively, to thereby alternately turn on the two switching elements 40a and 40b.

When either of the switching elements 40a and 40b for discharging, for example, the element 40a is on, the capacitor 18 discharges allowing a discharge current $I_L$ to flow via the ON-state switching element 40a, the inductance coil 42, the output capacitor 44 and the reverse-current prevention diode 48 to the excitation lamp 102. This discharge current, that is, the lamp current $I_L$ causes a lighting of the excitation lamp 102.

When the switching element 40a goes off, the capacitor 18 stops for a while to discharge; however, the electromagnetic energy and electric charge energy stored respectively in the inductance coil 42 and the output capacitor 44 are released allowing the lamp current $I_L$ to continue to flow. Immediately thereafter, the switching element 40b on the other goes on, allowing the capacitor 18 to resume the discharge.

As described above, the two switching elements 40a and 40b for discharging are alternately turned on by the high-frequency switching control signals Ga and Gb at 50 kHz in total, so that the lamp current IL can continuously flow without being interrupted. As a result of this, the excitation lamp 102 continues to light up, ensuring an acquisition of the laser beam LB oscillated continuously from the laser oscillating unit 100.

Between the reverse-current prevention diode 48 and the excitation lamp 102 is interposed a current sensor 50 for detecting a lamp current $I_L$. In response to an output signal from the current sensor 50, a current detection circuit 52 generates a lamp current detection signal $SI_L$ indicative of a magnitude (e.g., current effective value) of the lamp current $I_L$. The lamp current detection signal $SI_L$ is fed to the control unit 14.

The opposed terminals of the output capacitor 44 are connected to input terminals of a voltage detection circuit

54. Acquired from an output terminal of the voltage detection circuit 54 is a voltage detection signal $SE_D$ indicative of a voltage $E_D$ at the output capacitor 44. This voltage detection signal is also fed to the control unit 14.

A temperature sensor 56 comprised for instance of a thermistor is provided in the vicinity of the switching circuit 40 for discharging. In response to an output signal from the temperature sensor 56, a temperature detection circuit 58 generates a temperature detection signal ST indicative of a temperature in the region of the switching circuit 40 for discharging. This temperature detection signal ST is also fed to the control unit 14.

The control unit 14 is comprised for instance of a microprocessor and is connected via an appropriate interface circuit (not shown) to an input device or a display device (not shown). In compliance with a predetermined program, the control unit 14 provides a desired control in the apparatus, on the basis of various set values and various measured values.

For example, the control unit 14 provides a feedback constant-current control to the lamp current $I_L$, on the basis of a lamp current detection signal $SI_L$ from the current detection circuit 52. More specifically, in each unit time (cycle) to control the switching actions of the switching elements 40a and 40b for discharging, the control unit 14 compares the lamp current detection signal $SI_L$ with a set current value to obtain an error, and at the next cycle it provides a variable control to the pulse width of the switching control signals Ga and Gb through a pulse-width modulation (PWM) so as to make the error null.

Figure 2:
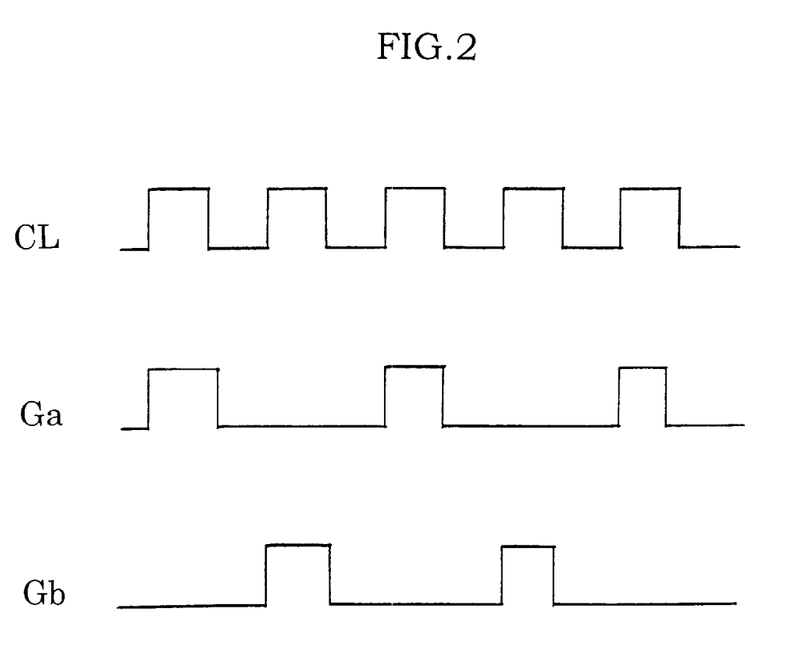
FIG. 2 is a waveform diagram showing phases and a timing relation of switching control signals fed to a parallel-type switching element for discharging in the embodiment.

FIG. 2 illustrates phases of the switching control signals Ga and Gb or a timing relation therebetween. In synchronism with an internal clock CL at 50 kHz, the control unit 14 provides as its output for instance in odd cycles of the clock CL the first switching control signal Ga in the form of H-level pulses, but in even cycles of the clock CL the second switching signal Gb in the form of H-level pulses. As a result of this, in the odd cycles the first switching element 40a goes on only during the periods when the first switching control signal Ga is at H-level, whereas in the even cycles the second switching element 40b goes on only during the periods when the second switching control signal Gb is at H-level.

Since this embodiment employs the PWM control as described above, the control unit 14 compares a current value ($SI_L$) of the lamp current $I_L$ when the first switching element 40a goes on in the odd cycles with a set current value to obtain an error, and determines the H-level duration (pulse width) of the second switching control signal Gb so as to make the error null in the next even cycles to thereby control the ON-time of the second switching element 40b. Then, the control unit 14 compares a current value ($SI_L$) of the lamp current $I_L$ in the even cycles with the set current value to obtain an error, and determines the H-level duration (pulse width) of the first switching control signal Ga so as to make the error null in the next odd cycles, to thereby control the ON-time of the first switching element 40a. Such a switching control is repeated on a cycle-to-cycle basis.

In this manner, although the switching circuit 40 for discharging looks externally as if a single switching element performs a switching action at 50 kHz under the pulse-width control, the two switching elements 40a and 40b perform separate switching actions at 25 kHz within the interior of the circuit 40. In this case, the two switching elements 40a and 40b are alternately turned on so that substantially a uniform current $I_L$ can flow therethrough even though they have respective somewhat different on-state resistance values, thereby preventing burdens or loads from concentrating on one side.

Thus, as compared with the case where the switching elements 40a and 40b are separately solely used, the number of times of the switching actions and the burdens are halved, allowing the service life thereof to be extended accordingly. As a result, the YAG laser beam processing apparatus of this embodiment achieves improvements in the production control and quality.

When an excessive lamp current $I_L$ flows or the switching circuit 40 for discharging becomes overheated, the control unit 14 imparts control signals Ki and Kt for turning off the main power supply unit 10 to the thyristor control circuit 38 by way of an AND gate 60.

In the normal state, the control signals Ki and Kt are kept at H-level, allowing the output terminal of the AND gate 60 to impart an H-level control signal K to the thyristor control circuit 38. As a result, the thyristor control circuit 38 keeps the thyristor 36 on (conductive).

However, in case for example the switching circuit 40 for discharging is broken down and the lamp current $I_L$ has exceeded a predetermined current monitor value, the control signal Ki goes to L-level, with the result that the output signal K from the AND gate 60 also goes to L-level, allowing the thyristor control circuit 38 to switch the thyristor 36 to OFF-state (non-conductive). In case the switching circuit 40 has heated up to a temperature exceeding a predetermined temperature monitor value without causing the breakdown thereof, the control signal Kt goes to L-level, in response to which the thyristor control circuit 38 switches the thyristor 36 to OFF-state(non-conductive)

The control unit 14 issues an inverter switching control signal HV to control the booster circuit 12. The booster circuit 12 of this embodiment receives a charging voltage $E_C$ at the capacitor 18 and generates a boost voltage $E_F$ of e.g., 2500V which is a predetermined voltage necessary for the start of lighting of the excitation lamp 102.

Figure 3:
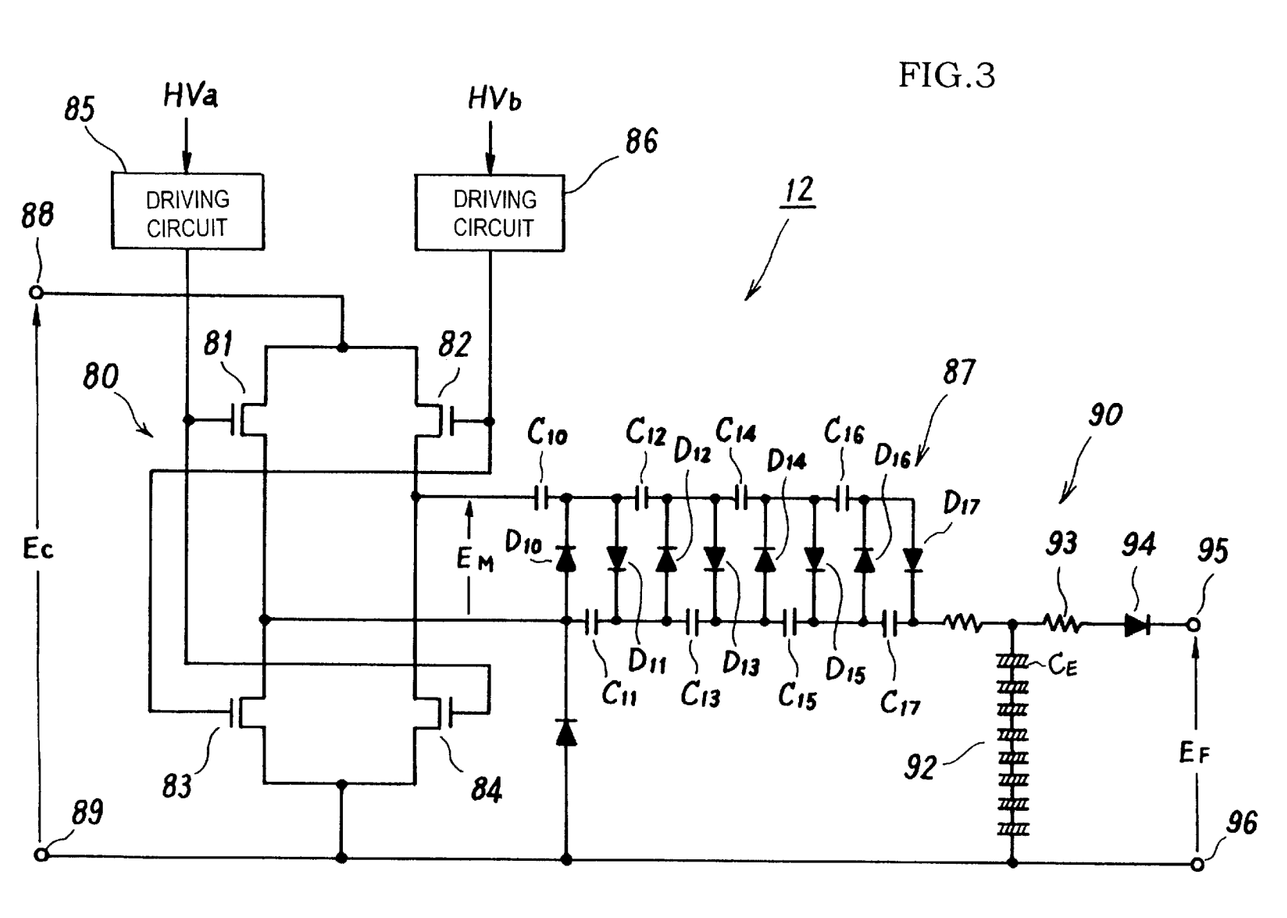
FIG. 3 is a circuit diagram showing a circuit configuration of a booster circuit in the embodiment.

FIG. 3 illustrates a circuit configuration of the booster circuit 12. The booster circuit 12 includes an inverter 80, inverter driving circuits 85 and 86, a Cockcroft boosting circuit 87 and a booster voltage output circuit 90.

The inverter 80 consists of four transistors 81, 82, 83 and 84 which are bridge-connected to one another, and has input terminals 88 and 89 for receiving a DC voltage $E_C$ from the capacitor 18. In response to two-phase inverter switching control signals HVa and HVb having 180° shifted phases from the control unit 14, the driving circuits 85 and 86 turn on alternately a first pair of transistors (81, 84) and a second pair of transistors (82, 83) of the inverter 80. The inverter switching control signals HVa and HVb are issued in the form of pulses having a frequency of 50 kHz for instance.

Through the switching actions as described above, the inverter 80 generates a high-frequency AC voltage $E_M$ in the form of pulses (rectangular waves) whose voltage level (amplitude) is substantially equal to the voltage level of the input DC voltage $E_C$ and whose frequency is equal to the switching frequency (50 kHz). This high-frequency AC voltage $E_M$ is applied to the Cockcroft boosting circuit 87.

The Cockcroft boosting circuit 87 is a four-stage boosting circuit consisting of eight capacitors $C_{10}$ to $C_{17}$ and eight diodes $D_{10}$ to $D_{17}$ which are connected in a ladder form. In the Cockcroft boosting circuit 87, a high-frequency AC voltage $E_M$ having an amplitude of 360V and a frequency of 50 kHz from the inverter 80 is rectified by the diodes $D_{10}$ to $D_{17}$ while simultaneously it is boosted up to about eight-times voltage value (of the order of 2800V) in such a manner as to be accumulated in series on the capacitors $C_{10}$ to $C_{17}$.

The booster voltage from the Cockcroft boosting circuit 87 is temporarily charged into an output capacitor 92 consisting of eight electrolytic capacitors $C_E$ of 100 μF for instance which are connected in series, after which it is provided as outputs from output terminals 95 and 96 by way of a resistor 93 and a reverse-current prevention diode 94. The reverse-current prevention diode 94 can be for example a diode having withstand voltage of 600V.

In this manner, the booster circuit 12 of this embodiment is subjected to a DC voltage $E_C$ from the capacitor 18. The capacitor voltage $E_C$ is a constant voltage obtained by rectifying and boosting a 220V single-phase AC power supply voltage $E_A$ with a high power factor by way of the single-phase rectifying circuit 16, the charging circuit 20 and the power factor control circuit 34. The capacitor voltage $E_C$ is stably kept at a set voltage value (360V) without being affected by a fluctuation of the AC power supply voltage $E_A$.

In the booster circuit 12, the input DC voltage $E_C$ is converted by the inverter 80 into a pulse-like AC voltage $E_M$ having a high frequency (50 kHz). Due to the fact that the voltage level of the input DC voltage $E_C$ remains stabilized at the set voltage value (360V) against a fluctuation of the AC power supply voltage $E_A$ and so forth, the voltage level (amplitude) of this pulse-like AC voltage $E_M$ also becomes stabilized in the close vicinity of the set voltage value (360V).

Thus, such a high-frequency pulse-like AC voltage $E_M$ having a stabilized voltage level (amplitude) from the inverter 80 is boosted in such a manner as to be accumulated little by little at a high frequency while simultaneously being rectified by the Cockcroft boosting circuit 87, whereby a stable high-voltage DC booster voltage $E_F$ is obtained.

In addition to the fact that the voltage level of the DC voltage $E_C$ input to the booster circuit 12 is stabilized as described hereinabove, a high-frequency or fine pulse-like AC voltage $E_M$ is applied by the inverter 80 to the Cockcroft boosting circuit 87, so that the voltage level of the booster voltage $E_F$ becomes also stabilized allowing it to remain in the close vicinity of the set value (e.g., 2700V) without being affected by a possible fluctuation of the AC power supply voltage $E_A$.

This booster circuit 12 is used to start the lighting of the excitation lamp 102. The excitation lamp 102 is comprised for instance of a xenon lamp, in which a gas is sealed in a glass tube with electrode terminals fitted to the opposed ends thereof. In order to light up the excitation lamp 102, the gas insulation must be broken through in the lamp so as to allow a discharge between the two electrodes.

When lighting the excitation lamp 102, the control unit 14 first activates the main power supply unit 10 and the booster circuit 12. More specifically, for the main power supply unit 10, the control unit 14 sets the control signals Ki and Kt to H-level allowing the thyristor control circuit 38 to turn on the thyristor 36, while it imparts the switching control signals Ga and Gb to the switching circuit 40 for discharging. For the booster circuit 12, the control unit 14 imparts the inverter switching control signals HVa and HVb to the inverter driving circuits 85 and 86, respectively.

Then, the control unit 14 actuates the trigger circuit (not shown). The trigger circuit applies a high voltage of about 20 kV to between a cathode terminal of the excitation lamp 102 and a metal plate extending around the glass tube of the lamp 102 to break down the gas insulation within the lamp 108 to thereby lower the impedance. This is followed by a current flow into the excitation lamp 102 at a high voltage of about 2500V from the booster circuit 12, with the result that the impedance of the excitation lamp 102 is further lowered. Afterwards, an enough amount of current (lamp current) is allowed to flow even at the lamp voltage $E_D$ of the order of 150V from the main power supply unit 10.

When the excitation lamp 102 starts to light up, the control unit 14 ceases the supply of the inverter switching control signals HV (HVa, HVb) to stop the operation of the booster circuit 12. The reverse-current prevention diode 48 of the main power supply unit 10 can be a high-withstand-voltage diode having withstand voltage of 3200V for instance.

In the case of the power supply apparatus for laser of this embodiment, even though the input AC power-supply voltage $E_A$ has fluctuated upon the start of lighting of the excitation lamp, the booster circuit 12 applies to the excitation lamp 102 a stable booster voltage $E_F$ which is kept at a set voltage value (2700V) or made into a constant voltage, so that the excitation lamp 102 can start to light up in a safe and secure manner.

It is to be appreciated in the case of the power supply apparatus for laser of this embodiment that the single-phase rectifying circuit 16, the charging circuit 20 and the capacitor 18 are shared by the main power unit 10 and the booster circuit 12. However, the booster circuit 12 works only at the time of start of lighting of the lamp, whereas after the lighting only the main power supply unit 10 functions, to thereby obviate the problem of conflict timewise.

Figure 4:
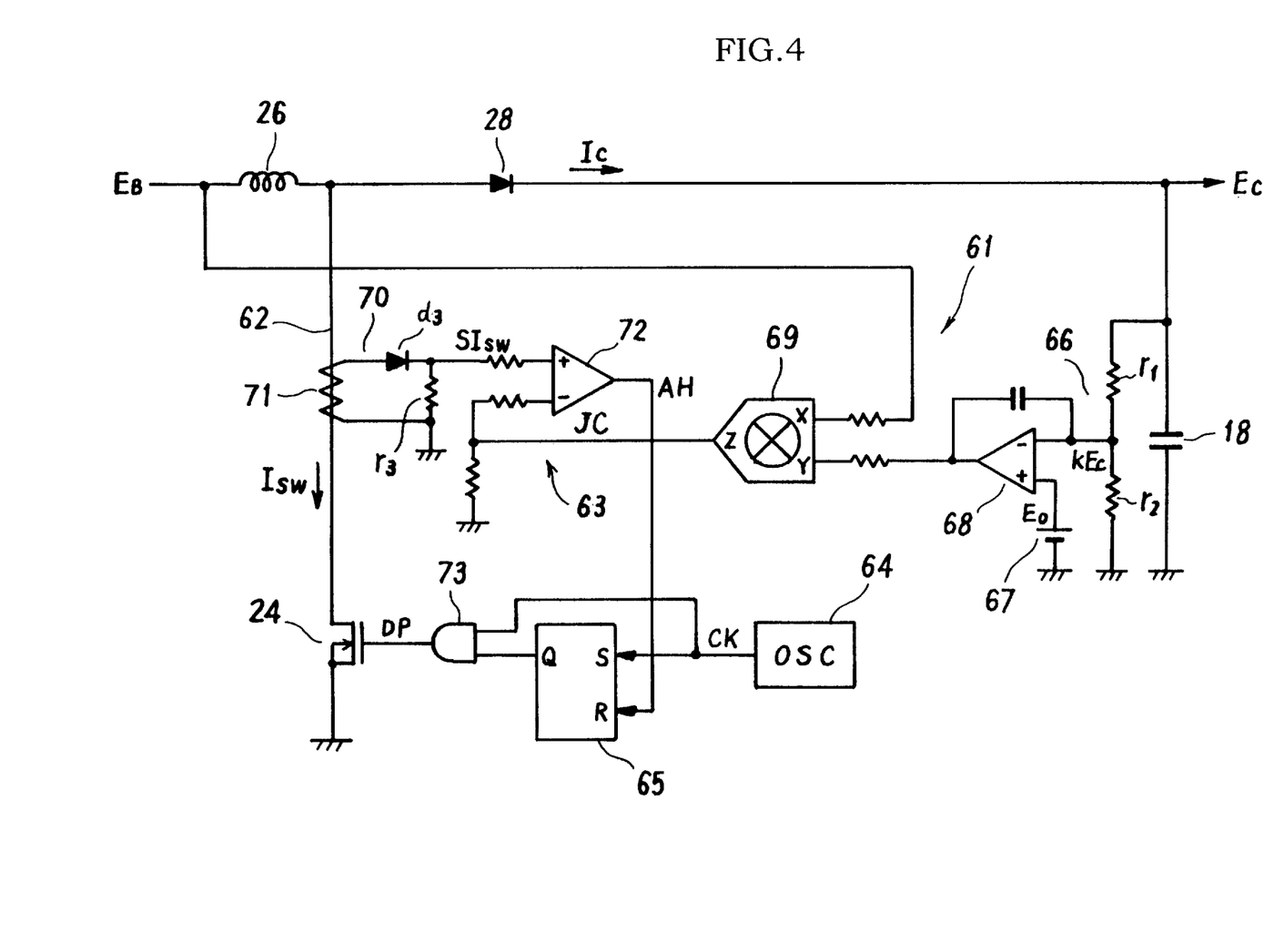
FIG. 4 is a circuit diagram showing a circuit configuration of a power-factor control circuit in the embodiment.

Description will then be made of a configuration and a function of the power factor control circuit 34 in accordance with this embodiment. Referring to FIG. 4, a circuit configuration of the power factor control circuit 34 is shown. The power factor control circuit 34 comprises a reference value generation circuit 61, a bypass circuit 62, a switch timing detection circuit 63, a clock circuit 64 and a current switching circuit 65.

The reference value generation circuit 61 includes a voltage dividing circuit 66, a reference voltage source 67, an operational amplifier 68 and a multiplier 69. The voltage dividing circuit 66 serves to divide a charging voltage $E_C$ at the capacitor 18 at a certain ratio k by means of resistors $r_1$ and $r_2$. The operational amplifier 68 finds a difference $(E_0-kE_C)$ between a divided voltage $kE_C$ from the voltage dividing circuit 66 and a reference voltage $E_0$ from the reference voltage source 67. The multiplier 69 has an input terminal X on one hand for receiving a DC voltage $E_B$ having a full-wave rectified waveform from the single-phase rectifying circuit 16 and an input terminal Y on the other hand for receiving a difference voltage $(E_0-kE_C)$ from the operational amplifier 68. The multiplier 69 calculates a product $[E_B(E_0-kE_C)]$ of the two input voltage values and issues a voltage signal indicative of a value (instantaneous value) of the product as a reference value signal JC from its output terminal Z.

The reference value signal JC derived from the reference value generation circuit 61 is proportional to the DC voltage $E_B$ from the single-phase rectifying circuit 16 but is in inverse proportion to the charging voltage $E_C$ at the capacitor 18. More specifically, this reference value signal Jc has a voltage waveform similar to a waveform of the DC voltage $E_B$ from the single-phase rectifying circuit 16 and has characteristics that its voltage level (amplitude) goes up accordingly as the capacitor voltage $E_C$ lowers but goes down accordingly as the capacitor voltage $E_C$ rises.

The reference value signal JC from the reference value generation circuit 61 is fed to the switch timing detection circuit 63. The switch timing detection circuit 63 includes a current sensor 70 and a comparator 72. The current sensor 70 consists of a current transformer coil 71, a diode $d_3$ and a resistor $r_3$ and generates a current detection signal (voltage) $SI_{SW}$ indicative of a current value (instantaneous value) of a bypass current $I_{SW}$ flowing through the bypass circuit 62. The comparator 72 receives the current detection signal $SI_{SW}$ from the current sensor 70 and the reference value signal JC from the reference value generation circuit 61, and provides as its output a switch timing signal AH in the form of H-level pulses when the voltage level of the signal $SI_{SW}$ reaches the voltage level of the signal JC. This switch timing signal AH is fed to the current switching circuit 65.

The current switching circuit 65 is formed of a reset-set flip-flop, which has a set terminal S for receiving a clock pulse CK at a high frequency, e.g., 75 kHz from the clock circuit 64 and a reset terminal R for receiving the switch timing signal AH from the switch timing detection circuit 63. An output Q of the current switching circuit 65 is fed to an input terminal on one hand of an AND gate 73. The clock pulse CK from the clock circuit 64 is fed to an input terminal on the other hand of the AND gate 73. An output from the AND gate 73 is fed as a control pulse DP to a gate terminal of the switching element 24 for charging.

Figure 5:
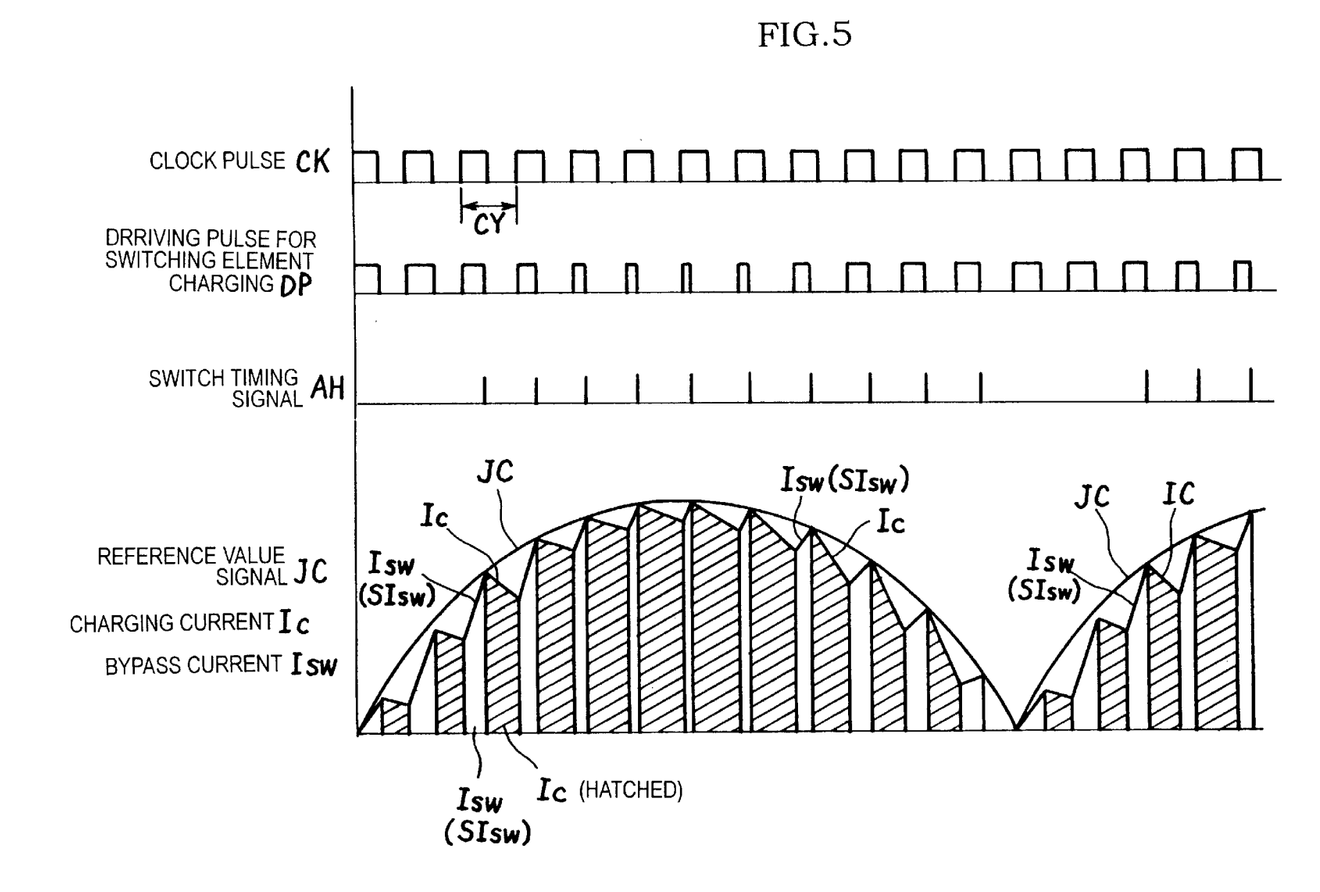
FIG. 5 is a waveform diagram showing waveforms at parts of the power-factor control circuit in the embodiment.

FIG. 5 illustrates a function of the power factor control circuit 34. When the clock circuit 64 issues clock pulses CK, the output Q from the current switching circuit 65 goes to H-level at the leading edges of the pulses CK, allowing the AND gate 73 to issue H-level control pulses DP. In response to these H-level control pulses DP, the switching element 24 for charging goes on so that the bypass circuit 62 becomes conductive under a substantially short-circuited state.

Then, a current path on the output side of the single-phase rectifying circuit 16 is switched from the initial path leading into the capacitor 18 side to a path extending though the bypass circuit 62. In other words, once the charging current $I_c$ flowing into the capacitor 18 is temporarily interrupted, the bypass current $I_{SW}$ starts to flow into the bypass circuit 62. At this switching point, the current value (the value upon the interruption) of the charging current $I_C$ is continuous with the current value (the initial value) of the bypass current $I_{SW}$.

When the bypass current $I_{SW}$ flows into the bypass circuit 62, the current sensor 70 in the switch timing detection circuit 63 generates a current detection signal SISw corresponding to the bypass current $I_{SW}$. The bypass current $I_{SW}$ rapidly rises up from its initial value at the switching point of time, in response to which the current detection signal $SI_{SW}$ also sharply rises up. On the other hand, the voltage level of the reference value signal JC from the reference value generation circuit 61 is sinusoidal while keeping the similarity to the waveform (full-wave rectified waveform) of the output voltage $E_B$ from the single-phase rectifying circuit 16.

Thus, the instant the voltage level of the current detection signal $SI_{SW}$ reaches the voltage level of the reference value signal JC, an H-level switch timing signal AH is momentarily issued from the output terminal of the comparator 72.

Then, in response to this switch timing signal AH, the output Q from the current switching circuit 65 goes to L-level, allowing the control pulse DP output from the AND gate 73 to fall down to L-level. As a result, the switching element 24 is put into the OFF-state, interrupting the bypass circuit 62.

When the bypass circuit 62 is interrupted, the current path from the output of the single-phase rectifying circuit 16 is switched to the path leading to the capacitor 18. Accordingly, a bypass current $I_{SW}$ is interrupted while simultaneously a charging current $I_C$ starts to flow into the capacitor 18. Generated in the inductance coil 26 at that time is an electromotive force attributable to the bypass current $I_{SW}$ which has just been interrupted but which had flowed until just a little while ago, the electromotive force being added to the output voltage $E_B$ at the single-phase rectifying circuit 16, which in turn is applied to the capacitor 18. This allows the charging current $I_C$ to start to flow with an initial value equal to the current value upon the interruption of the bypass current $I_{SW}$. It is to be appreciated that the charging current $I_C$ decreases gradually from its initial value since the impedance of the charging circuit is larger than the impedance of the bypass circuit 62 in the short-circuited state.

When the clock circuit 64 issues the next clock pulse CK, the next cycle CY starts allowing the current switching circuit 65 to perform a switching from the charging current $I_C$ to the bypass current $I_{SW}$ in the same manner as the above. Then, once the bypass current $I_{SW}$ reaches the reference value signal JC, the bypass current $I_{SW}$ is switched to the charging current $I_C$ in the same manner as the above.

It is to be noted that even though the output Q from the current switching circuit 65 remains at H-level (in other words, even though the bypass current $I_{SW}$ has not reached the reference value signal JC) at the point of time when the clock pulse CK has fallen from H-level to L-level in each CY-cycle, the control pulse DP output from the AND gate 73 goes to L-level so that the switching element 24 for charging is compulsorily switched to OFF-state.

When the output voltage $E_B$ at the single-phase rectifying circuit 16 is relatively low (at the bottom of the full-wave rectified waveform), although the reference value signal JC becomes also low, the bypass current $I_{SW}$ may not possibly reach the reference value signal JC within the H-level duration of the clock pulse CK because the former is even smaller than the latter. By virtue of the compulsory switching function described above, however, a switching to the charging current $I_C$ is necessarily achieved during the periods when the clock pulse CK is at H-level.

On the contrary, when the output voltage $E_B$ at the single-phase rectifying circuit 16 is relatively high (in the region of the peak value of the full-wave rectified waveform), although the reference value signal JC becomes high, although the bypass current $I_{SW}$ can reach the reference value signal JC in a brief period of time due to even larger rate of increase of the bypass current $I_{SW}$. For this reason, the charging current $I_C$ is allowed to flow with a large current value over the major part of each cycle CY.

Besides, the duty ratio of the clock pulse CK in each cycle is optional and, for example, the H-level duration may be set to 80% with the L-level duration of 20%.

In the case of this power factor control circuit 34 in this manner, the charging current $I_C$ is fed to the capacitor 18 with such a current waveform as to simulate the waveform (full-wave rectified waveform) of the output voltage $E_B$ at the single-phase rectifying circuit 16, in other words, in such a manner as to allow the phase matching. It is thus possible for the power factor to approximate 1 as close as possible, that is, a ratio of an effective power supplied actually (effectively) to the excitation lamp 102 and the input power from the single-phase AC power supply approximates 1.

It is therefore possible for the single-phase type power supply apparatus for laser to realize a power efficiency and a laser oscillation efficiency equivalent to or higher than those of the three-phase type apparatus and to acquire a high-output laser beam LB.

The three-phase type power supply apparatus is largely occupied by the three-phase rectifying circuit, and the entire apparatus is bulky, weighty and costly. On this point, the single-phase rectifying circuit is small-sized and takes up a smaller space. In addition, in this power supply apparatus for laser 10, the charging current $I_C$ flows at a high frequency of the order of 75 kHz so that the inductance coil 26 of the charging circuit can be reduced in size. This achieves a reduction in weight, size and cost of the entire apparatus.

Furthermore, in this power supply apparatus for laser, the capacitor 18 is charged, by a step-up method, by being fed it with the sum of an electromotive force of the electromagnetic energy stored in the inductance coil 26 using the bypass current $I_{SW}$ and a DC voltage $E_B$ from the single-phase rectifying circuit 16. This enables the charging voltage $E_C$ at the capacitor 18 to boost up to a desired voltage, e.g., 360V, higher than the input AC voltage $E_A$ (220V).

The capacitor 18 is charged by the step-up method to a higher voltage than the input AC voltage $E_A$ in this manner, with the result that it is possible to keep constant the charging voltage $E_B$ at the capacitor 18 against fluctuations of the power supply voltage or other factors.

Figure 6:
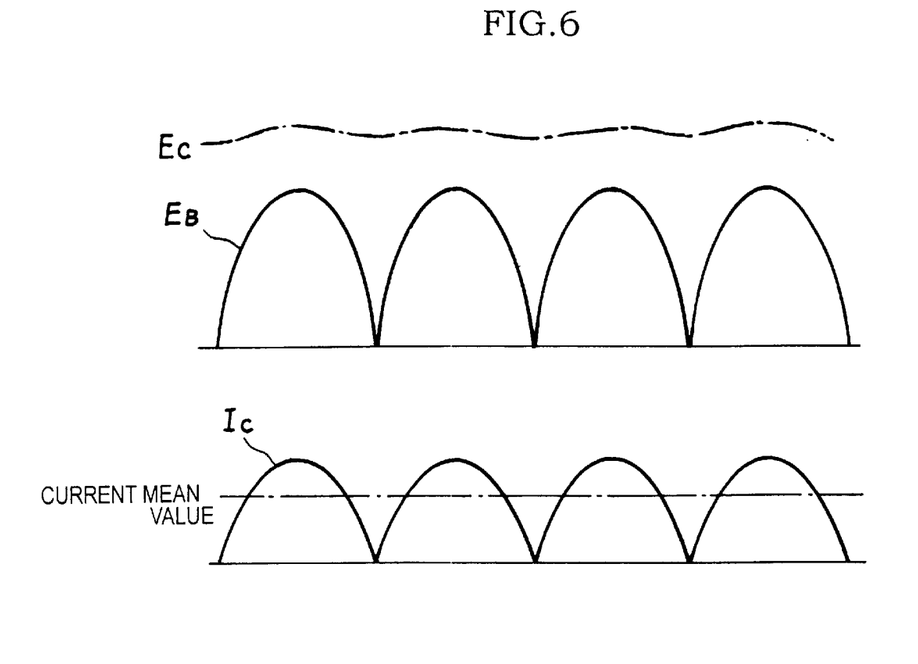
FIG. 6 is a waveform diagram showing a phase relation between an output voltage and a capacitor charging current of a rectifying circuit in a single-phase power supply apparatus for laser of the embodiment.
Figure 7:
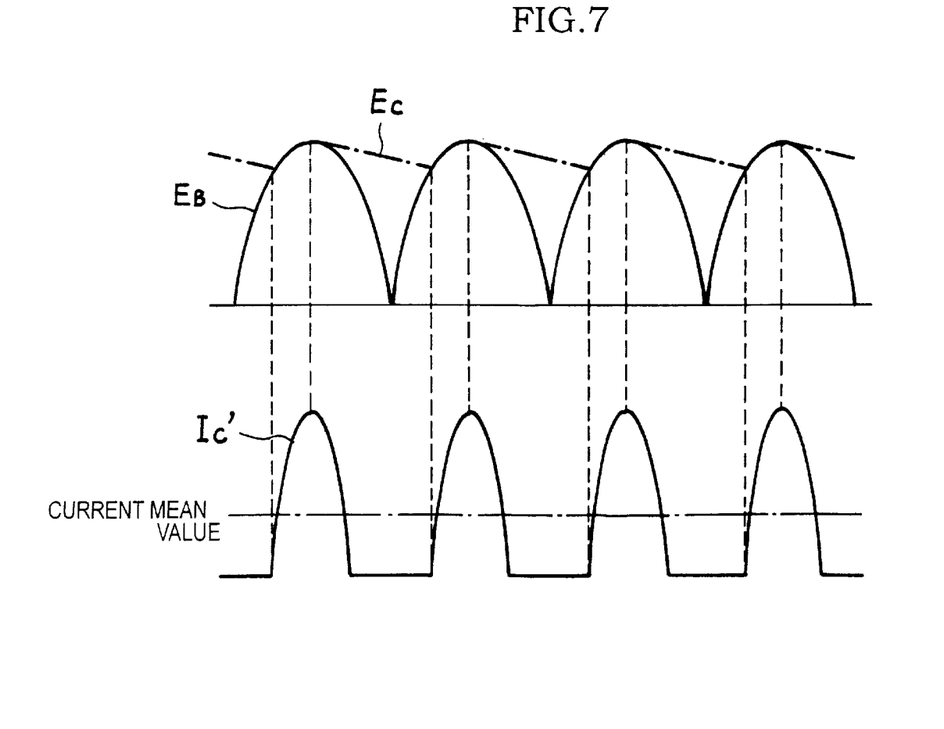
FIG. 7 is a waveform diagram showing a phase relation between the output voltage and the capacitor charging current of the rectifying circuit in a single-phase power supply apparatus for laser not provided with power factor control circuit of the embodiment.

FIG. 6 illustrates waveforms of the output voltage $E_B$ and the charging current $I_C$ of the single-phase rectifying circuit 16 in the power supply apparatus for laser of this embodiment. As a comparison example, FIG. 7 illustrates waveforms of the output voltage $E_B$ and the charging current $I_C'$ in cases where no power factor control circuit 34 is provided. Due to no provision of the power factor control circuit 34, the conventional single-phase power supply apparatus for laser merely has a power factor of the order of 60%. In contrast with this, the power supply apparatus for laser 10 of this embodiment can have a power factor improved up to about 98% by virtue of the provision of the power factor control circuit 34.

According to the power factor control circuit 34 of this embodiment, the current $I_L$ supplied to the capacitor 18 is allowed to coincide not only in phase but also in waveform with the output voltage $E_B$ at the single-phase rectifying circuit 16 so that an extremely high power factor can be realized. However, a relatively high power factor could be achieved even though quite different waveforms were employed with the phase matching only.

Description will then be made of the contactor provided in the main circuit of this power supply apparatus for laser.

As set forth hereinabove, the rated voltage $E_D$ applied to the excitation lamp 102 is about 150V, whereas the voltage $E_C$ at the capacitor 18 is 360V. In case the switching circuit 40 for discharging has shorted, the capacitor voltage $E_C$ (360V) is applied intactly to the excitation lamp 102, so that the contactor must immediately be turned off in order to protect the lamp 102.

This power supply apparatus for laser makes use of the thyristor 36 as the contactor for the main power supply unit 20. Since the current passing through the thyristor 36 becomes zero in each half-cycle, if a firing signal from the thyristor control circuit 38 is interrupted, the thyristor 36 can be turned off before the lapse of a half-cycle at the latest from the interruption.

Figure 8:
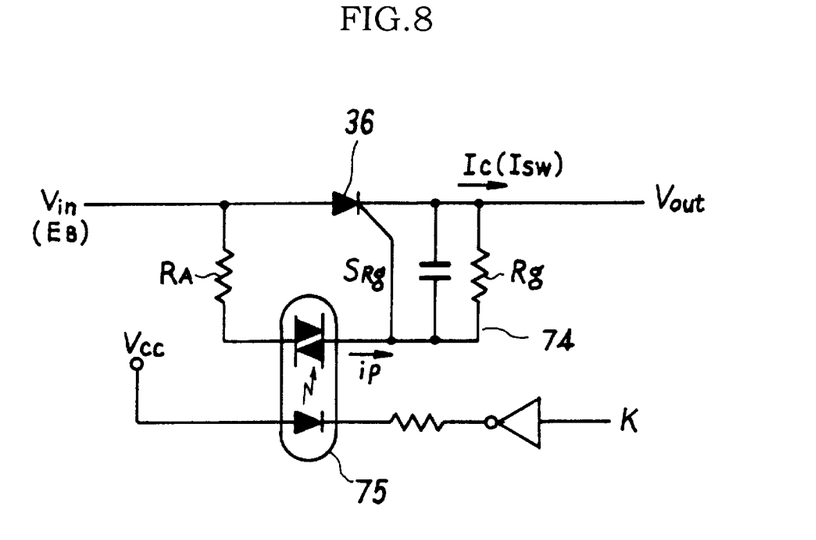
FIG. 8 is a circuit diagram showing a configuration of a thyristor control circuit in the embodiment.

FIG. 8 illustrates a circuit configuration of the thyristor control circuit 38. This thyristor control circuit 38 employs the anode trigger method in which a gate current or a firing signal $S_{Rg}$ is generated by a current $i_p$ flowing through a bypass circuit 74 including resistors $R_A$ and $R_g$ connected between the anode and cathode of the thyristor 36. A photo coupler 75 is also provided in the bypass circuit 74 to electrically isolate the main circuit from the control unit 14 to thereby protect the control unit 14.

Figure 9:
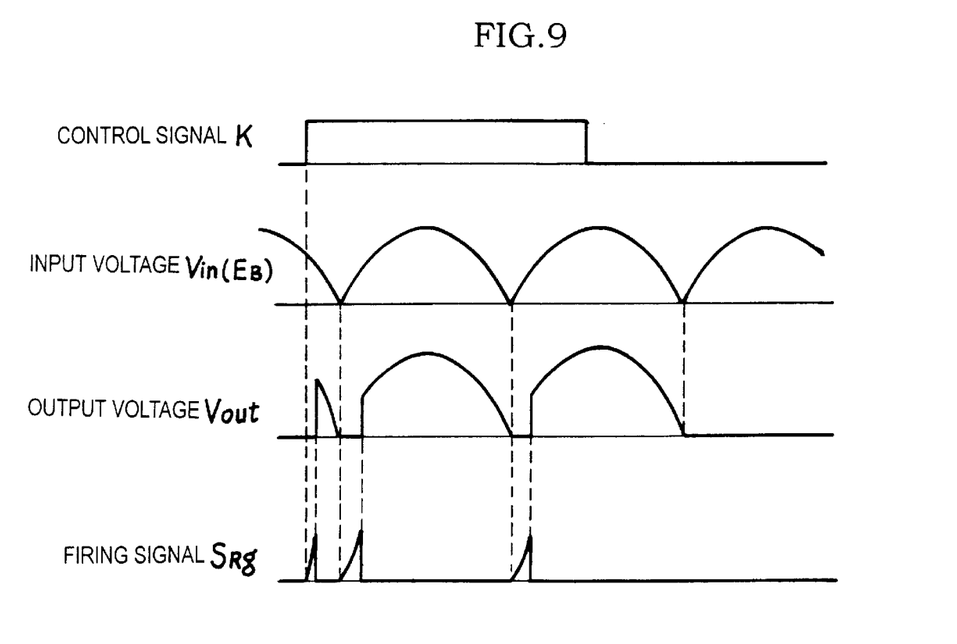
FIG. 9 is a waveform diagram showing waveforms of parts of the thyristor control circuit in the embodiment.

FIG. 9 illustrates waveforms obtained at parts within the thyristor control circuit 38. When a control signal K from the control unit 14 goes to H-level from L-level, a light-emitting diode in the photo coupler 75 emits a light to turn on a photo triac, allowing the current $i_p$ to flow through the bypass circuit 74 to generate the firing signal $S_{Rg}$ to finally turn on the thyristor 36. Afterwards, the instant the thyristor 36 is temporarily turned off at discontinuities of half-cycles, the current $i_p$ flows into the bypass circuit 74 to generate the firing signal $S_{Rg}$ to immediately turn on the thyristor 36.

As described hereinabove, when the lamp current $I_L$ becomes excessive or the switching circuit 40 for discharging becomes overheated, the control unit 14 sets the control signal K to L-level. Then, in the thyristor control circuit 38, the photo coupler 75 goes off breaking the bypass circuit 74 to prevent the firing signal $S_{Rg}$ from arising from the subsequent half-cycle. This means that the thyristor 36 is thoroughly switched to OFF-state within a half-cycle at the latest from the switching to L-level of the control signal K, to achieve a breaking of the main circuit.

The thyristor control circuit 38 having the configuration shown in FIG. 8 is advantageous in that a simple configuration can provide the firing signal for itself and achieve the isolation (safety) on the control unit.

It is to naturally be appreciated that other circuit configurations are also available. For example, it is also conceivable to employ a configuration in which a DC voltage source is provided to use a DC current as a firing signal so that the DC current (firing signal) can continue to flow into the gate of the thyristor 36 only for the duration when the thyristor 36 is to remain on.

Alternatively, an oscillator oscillating at a frequency higher enough than the commercial frequency may free run so that the output pulse from this oscillator can be fed via a pulse transformer to the gate of the thyristor 36 only for the duration when the thyristor 36 is to remain on.

It is also to be appreciated that after the switching of the thyristor 36 to the OFF-state, the single-phase rectifying circuit 16 supplies a limited (suppressed) current via the bypass circuit (30, 32) to the capacitor 18 at the point of time when the voltage $E_C$ at the capacitor 18 has become lower than the output voltage $E_B$ at the single-phase rectifying circuit 16.

Although the preferred embodiment has been described hereinabove, the present invention is not intended to be limited to the above embodiments, and various modifications and alterations would be possible without departing from the technical idea thereof.

For example, in the above embodiment, the pair of switching elements 40a and 40b have been connected in parallel in the switching circuit 40 for discharging. However, it would also be possible to provide a switching control for alternately turning on three or more switching elements connected in parallel with one another.

During the laser oscillation, in the above embodiment, the switching action of the switching circuit 40 has been controlled by use of the constant-current control method. However, it would also be possible to provide a switching control by use of a constant-voltage control or a constant-power control method based on a voltage detection signal $S_{ED}$ from the voltage detection circuit 54.

In the above embodiment, use has been made of an inverter switching control signal HV from the control unit 14 in order to control the start and termination of the generation of the booster voltage $E_F$ in the booster circuit 12. However, another method may also be employed in which a switch (not shown) is interposed between the capacitor 18 and the booster circuit 12 for instance so that the start and termination of generation of the booster voltage $E_F$ can be controlled by opening and closing the switch.

Furthermore, the booster voltage $E_F$ may be detected by a voltage detection circuit (not shown), and on the basis of the resultant voltage detection signal, the control unit 14 may generate an inverter switching control signal HV using a feedback method, e.g., a pulse width control method.

The PWM control in the above embodiment is merely an example of the method of controlling the current, voltage or power to be supplied to the excitation lamp, and other switching methods are naturally be available.

Although the power supply apparatus for laser of the above embodiment uses the single-phase AC power supply as the input AC power supply, the present invention is also applicable to the power supply apparatus using the three-phase AC power supply.

What is claimed is:

1. A power supply apparatus for laser for supplying an electric power to an excitation lamp which irradiates an optical energy for laser oscillation onto a laser medium, said power supply apparatus for laser comprising:

a single-phase rectifying circuit for receiving and rectifying a single-phase AC voltage having a commercial frequency;

a capacitor for temporarily storing a DC power from said single-phase rectifying circuit;

switching means for charging connected between said single-phase rectifying circuit and said capacitor;

lamp current supply means for causing said capacitor to discharge an electric energy stored therein to supply a lamp current to said excitation lamp; and power factor control means for controlling the switching action of said switching means for charging at a predetermined frequency higher than said commercial frequency so as to allow a phase of a charging current fed to said capacitor from said single-phase rectifying circuit to coincide with a phase of a DC voltage output from said rectifying circuit.

2. A power supply apparatus for laser according to claim 1, wherein said switching means for charging is connected, in parallel with said capacitor, to an output terminal of said single-phase rectifying circuit, and wherein an inductance coil is connected in series between said single-phase rectifying circuit and said switching means for charging, and wherein a diode is connected in series between said switching means for charging and said capacitor.

3. A power supply apparatus for laser according to claim 1, wherein said power factor control means provide a switching control of said switching means for charging at said predetermined frequency so as to allow a waveform of a charging current supplied to said capacitor to simulate a waveform of a DC voltage output from said rectifying circuit.

4. A power supply apparatus for laser according to claim 1, wherein said power factor control means include:

reference value signal generating means for generating a reference value signal which is inversely proportional to a charging voltage at said capacitor and which is proportional to a DC voltage from said rectifying circuit;

a bypass circuit including said switching means for charging connected in parallel with said capacitor;

switch timing detection means for generating a predetermined switch timing signal when a bypass current flowing though said bypass circuit reaches a value of said reference value signal;

a clock circuit for generating a clock pulse having said predetermined frequency; and current switch means for switching said switching means for charging from OFF state to ON state at the start of cycle in each cycle defined by said clock pulse, said current switch means switching said switching means for charging from ON state to OFF state in response to a switch timing signal from said switch timing detection means.

5. A power supply apparatus for laser according to claim 4, wherein said current switch means have means for compulsorily turning off said switching means for charging at a point of time previously set within said each cycle.

6. A power supply apparatus for laser according to claim 1, further comprising a thyristor connected between said single-phase rectifying circuit and said capacitor; and thyristor control means for continuously keeping said thyristor conductive in the normal state but breaking said thyristor when a predetermined abnormal state has occurred.

7. A power supply apparatus for laser for supplying an electric power to an excitation lamp which irradiates an optical energy for laser oscillation onto a laser medium, said power supply apparatus for laser comprising:

a rectifying circuit for receiving and rectifying an AC voltage having a commercial frequency;

a capacitor for temporarily storing a DC power from said rectifying circuit;

first and second switching elements each connected in series between said capacitor and said excitation lamp, said first and second switching elements being connected in parallel with each other; and control means for alternately turning on said first and second switching means at a predetermined frequency higher than said commercial frequency.

8. A power supply apparatus for laser according to claim 7, further comprising lamp current detection means for detecting a current value of a lamp current supplied to said excitation lamp in each cycle corresponding to said predetermined frequency; comparison means for comparing a current value of said lamp current with a set current value to obtain an error in said each cycle; and pulse width control means for variably controlling ON-time of said switching means in the next cycle so as to make said error null.

9. A power supply apparatus for laser for supplying an electric power to an excitation lamp which irradiates an optical energy for laser oscillation onto a laser medium, said power supply apparatus for laser comprising:

a rectifying circuit for receiving and rectifying an AC voltage having a commercial frequency;

a capacitor for temporarily storing a DC power from said rectifying circuit;

switching means connected between said capacitor and said excitation lamp;

lamp voltage detection means for detecting a lamp voltage applied to said excitation lamp from said capacitor;

lighting starter means for starting the lighting of said excitation lamp; and control means for providing a switching control of said switching means at a predetermined frequency higher than said commercial frequency so as to keep said lamp voltage at a predetermined standby voltage value which is higher than a rated voltage of said excitation lamp but lower than a voltage at said capacitor during the standby time before the start of lighting of said excitation lamp, said control means providing a switching control of said switching means at said predetermined frequency so as to allow said excitation lamp to be supplied with an electric power, a current or a voltage corresponding to a desired laser output after the start of lighting of said excitation lamp.

10. A power supply apparatus for laser for supplying an electric power to an excitation lamp in a laser oscillation unit, said power supply apparatus for laser comprising:

a rectifying circuit for receiving and rectifying an AC voltage having a commercial frequency;

a capacitor for temporarily storing a DC power from said rectifying circuit;

charging voltage control means for controlling a charging voltage at said capacitor so as to have a certain voltage value which has been set in advance;

lamp current supply means for causing said capacitor to discharge an electric energy stored wherein to supply a lamp current to said excitation lamp;

an inverter for receiving a charging voltage at said capacitor to convert it into an AC voltage having a predetermined frequency higher than said commercial frequency;

a boosting circuit for boosting an AC voltage from said inverter to generate a DC booster voltage having a previously set voltage value; and lighting start control means for allowing said booster voltage to be supplied to said excitation lamp at the start of lighting of said excitation lamp.

11. A power supply apparatus for laser according to claim 10, wherein said AC voltage having a commercial frequency is a single-phase AC voltage, and wherein said rectifying circuit is a single-phase rectifying circuit for full-wave rectifying said single-phase AC voltage.

12. A power supply apparatus for laser according to claim 11, wherein said charging voltage control means include switching means connected between said single-phase rectifying circuit and said capacitor, and power factor control means for providing a switching control of said switching means at a predetermined frequency higher than said commercial frequency so as to allow a charging current supplied into said capacitor from said single-phase rectifying circuit to be in phase with a DC voltage output from said single-phase rectifying circuit.

* * * * *